US011043124B2

(12) United States Patent
Yeung

(10) Patent No.: US 11,043,124 B2
(45) Date of Patent: Jun. 22, 2021

(54) ROADWAY INFORMATION DETECTION SYSTEM CONSISTS OF SENSORS ON THE AUTONOMOUS VEHICLES AND DEVICES FOR THE ROAD

(71) Applicant: Peter Yeung, Ottawa (CA)

(72) Inventor: Peter Yeung, Ottawa (CA)

( * ) Notice: Subject to any disclaimer, the term of this patent is extended or adjusted under 35 U.S.C. 154(b) by 103 days.

(21) Appl. No.: 16/245,503

(22) Filed: Jan. 11, 2019

(65) Prior Publication Data

US 2020/0226924 A1 Jul. 16, 2020

Related U.S. Application Data

(60) Provisional application No. 62/624,385, filed on Jan. 31, 2018.

(51) Int. Cl.
| | | |
|---|---|---|
| *E01F 9/30* | (2016.01) |
| *G08G 1/0967* | (2006.01) |
| *G05D 1/00* | (2006.01) |
| *G06K 9/00* | (2006.01) |

(52) U.S. Cl.
CPC ........ *G08G 1/096725* (2013.01); *E01F 9/30* (2016.02); *G05D 1/0088* (2013.01); *G06K 9/00818* (2013.01); *G08G 1/096783* (2013.01); *G05D 2201/0213* (2013.01)

(58) Field of Classification Search
CPC ........ G08G 1/096725; G08G 1/096783; E01F 9/30; G05D 1/0088; G05D 2201/0213; G06K 9/00818

See application file for complete search history.

(56) References Cited

U.S. PATENT DOCUMENTS

| | | | | |
|---|---|---|---|---|
| 9,261,881 B1* | 2/2016 | Ferguson | ............. | B60W 30/10 |
| 9,383,753 B1* | 7/2016 | Templeton | ............. | G01S 17/42 |
| 10,509,407 B2* | 12/2019 | Absmeier | ............. | G08G 1/052 |
| 2008/0040029 A1* | 2/2008 | Breed | ............. | G01S 19/50 |
| | | | | 701/514 |
| 2016/0132705 A1* | 5/2016 | Kovarik | ............. | G06K 7/10376 |
| | | | | 340/10.3 |
| 2019/0130743 A1* | 5/2019 | Dabby | ............. | H04W 4/44 |
| 2019/0132709 A1* | 5/2019 | Graefe | ............. | G08G 1/0133 |

* cited by examiner

*Primary Examiner* — Michael C Zarroli

(57) ABSTRACT

The present invention relates to the guidance of autonomous vehicles and in particular, relates to guiding an autonomous vehicle along a roadway by means of active devices with a system which works during normal and inclement weather as well as under any luminous conditions. These active devices are embedded in the passive and/or active road details such as traffic signs traffic lights, warning lights etc. These active devices provide data relating to road conditions, speed, road layout etc. as well as other information such as availability of parking spaces. Accordingly, through networks of sensors and devices the autonomous vehicle can obtain road details in real-time in any weather, illumination, visibility etc.

20 Claims, 4 Drawing Sheets

Figure 1 – A scenario for autonomous vehicle on a road way
[1] Devices[d1]: Red box can be all could be are of active or passive device(s)
[2] Senors[s2] located within the autonomous vehicle represented by the red ball
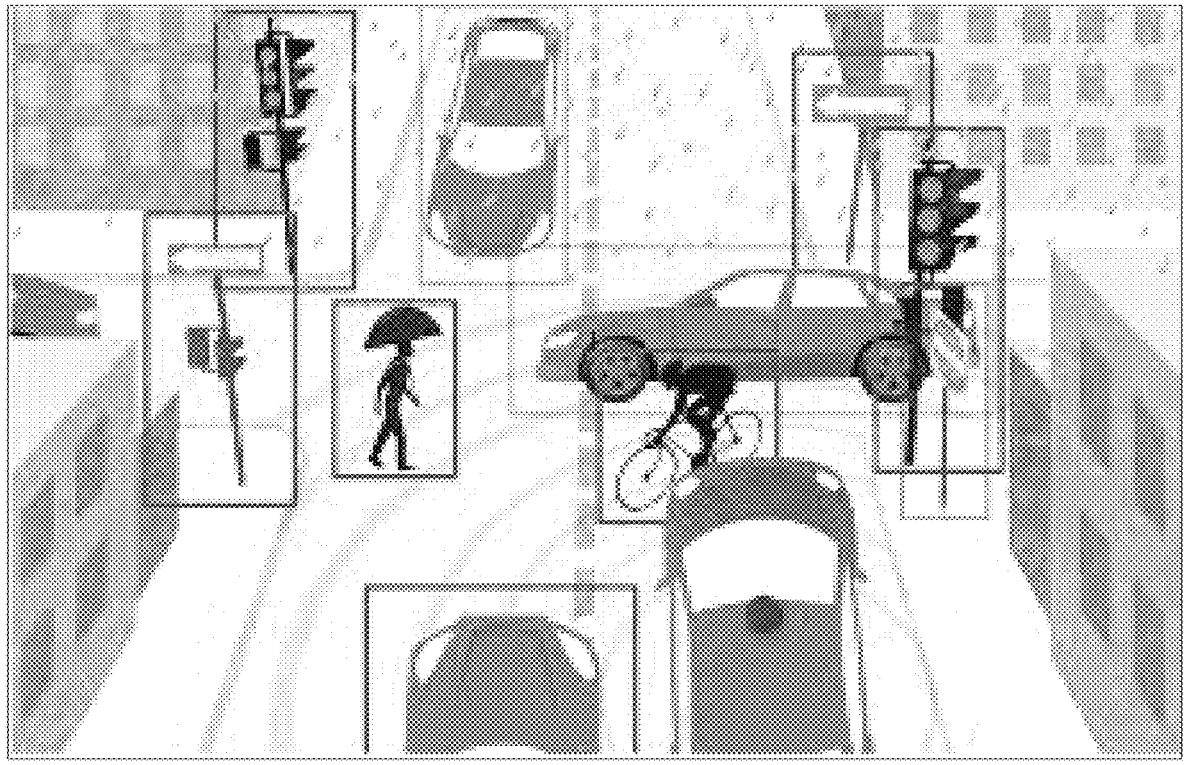

Figure 2 – Showing discovery signal are sent out by the autonomous vehicle
[1] Devices[d1] are denoted in green and red boxes:
[2] Senors[s2] are denoted by the red/green wave like signals that emanate from the vehicle Figure 3 – various road signs/cone and etc
These are samples of the road signs that are deployed today this all can be depicted as Devices[d1]
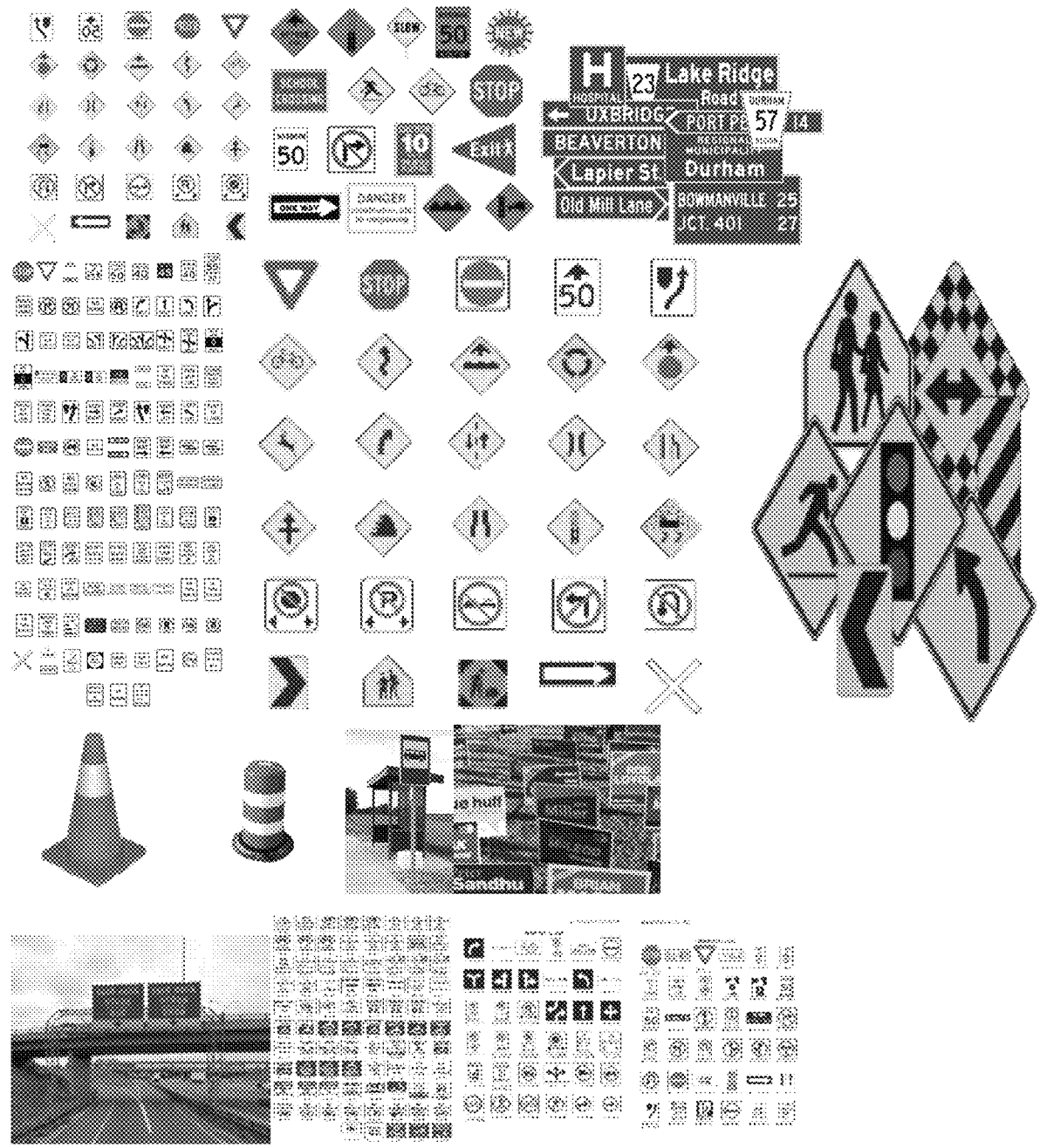

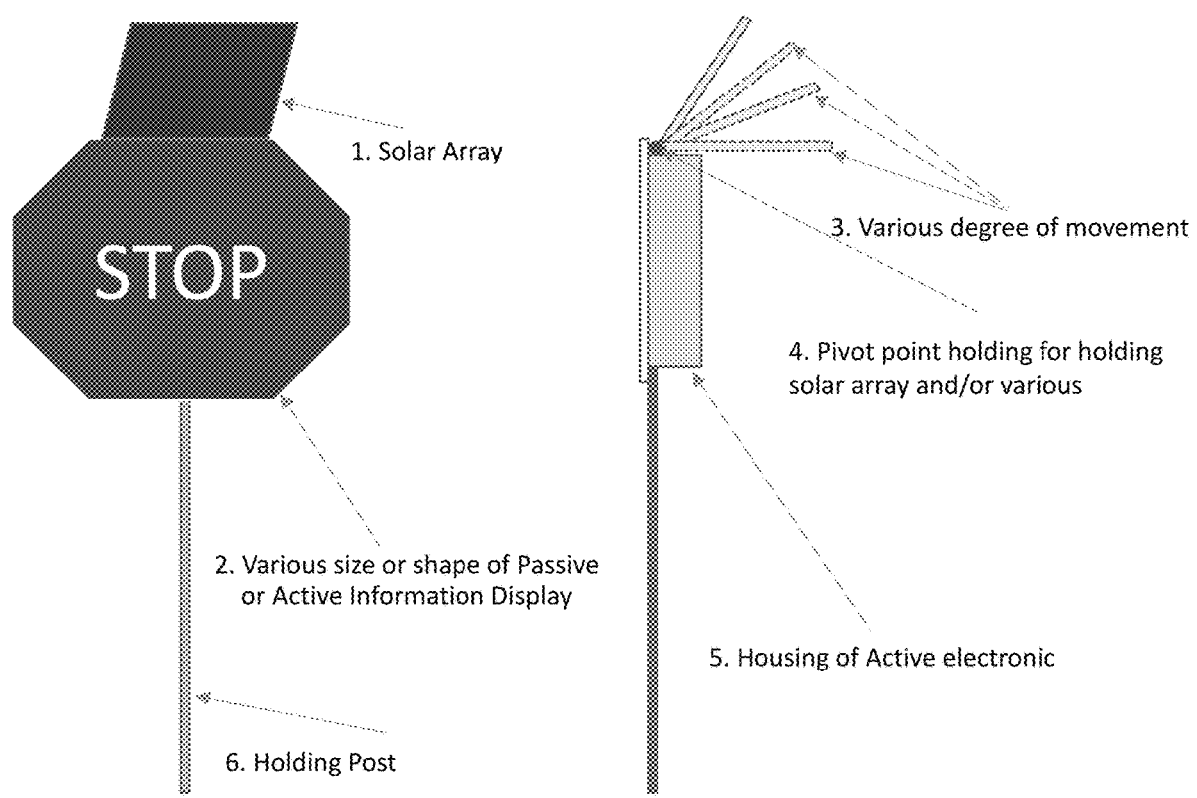
Figure 4 – sample of stop signs being converted from passive to active devices

ROADWAY INFORMATION DETECTION SYSTEM CONSISTS OF SENSORS ON THE AUTONOMOUS VEHICLES AND DEVICES FOR THE ROAD

FIELD OF THE INVENTION

The present invention relates to the guidance of autonomous vehicles and in particular, relates to guiding an autonomous vehicle along a roadway by means of active devices [d1] during normal and inclement weather that will work under any luminous conditions.

BACKGROUND

The Proposed sensor devices are strategically placed in or on the vehicle that will detect active devices [d1]. The Devices [d1] could be self-powered by solar and/or batteries with active electronics to process approaching vehicles or/and pedestrians for where powers are not readily available. This self-contained or/and networked device[d1] will either receive a discovery signal from the approaching vehicle or self-detect the vehicle/pedestrian or even provided by the network. Once either vehicle or pedestrian is known then the device[d1] will either reply with the predetermined information to the vehicle or/and has already display the "status" (ie: stop sign) or/and it displays the information.

Currently, the autonomous vehicles are helpless and can't or don't know the signs or road details without aid of camera system or detailed pre-mapped system of navigation. In use today, the navigation system is either GPS based for obtaining details of the roads or/and uses LiDAR, or/and optical (Camera) based for mapping of the road network sign(s) in conjunction with pre-mapped extremely detailed road information. This pre-mapping of the road is inefficient and, in most cases, impractical if there are continual changes to the roadways (especially with the rate of change ranging from daily to hourly). These constant changes can create havoc to autonomous vehicles on the road if they do not have the latest updates or if there are changes of the road networks. This could potentially result in a big catastrophe. Even if feasible, the amount of changes will require a multitude of road networks to be re-mapped. This will not give the autonomous vehicles the information it needs to navigate the roadway in a timely manner.

Furthermore, current technologies such as camera (optical), LiDAR, and other roadway interpretation systems fail under severe weather conditions and under certain luminous conditions. As such, the present invention claims will help evolve the self-driving, autonomous vehicles to navigate the road in a more effective manner under normal or severe weather condition and any luminous conditions.

Based on the preliminary research of the current technologies that are deployed or proposed to solve the navigation for the autonomous vehicles on our roads today, all fail to navigate under inclement weather conditions and are costly to implement. However, the present invention below represents a more economical and efficient way to implement a self-assisted navigation system. For example, one of the claims is to modify the existing passive signage(s) to an active device so that sensors on the autonomous vehicle can accurately pick up the information ahead before it traverse the road. These details of the road could be a simple stop sign(s) or parking spaces available ahead on the road and can be even adapted to provide information from pass stop to approaching autonomous bus—especially under (inclement weather and any luminous) conditions.

SUMMARY OF INVENTION

This disclosure relates to an autonomous vehicle and a system for controlling the vehicle, more specifically, the present disclosure is directed towards autonomous vehicles with a plurality of sensor devices to read road information then to navigate along the roadway.

It is the objective of the present disclosure to provide an improved autonomous vehicle and a system of sensor devices for detecting the road information from passive signage(s)/traffic cone(s) which can be read/received when in severe weather conditions and/or luminous conditions.

According to an aspect of the disclosure it is to provide an autonomous vehicle, comprising:

A system of sensor devices strategically placed on an autonomous vehicle to read/receive road information whereby this information is then processed by a hub, then passed onto either an autonomous control system and/or 3D map navigation database system to decide on how to navigate the road safely in a real-time manner, the system comprises of:

The hub includes processing and storage capability;

Sensor devices on the vehicle consisting of components that will transmit a discovery signal, and received information from active devices on the roadway;

Wherein the hub, once the roadway information is processed it is then communicated back to the autonomous control system and/or 3D map navigation database system where a roadway path is formulated for navigation; and Wherein road information is captured and mapped in real-time for use and updated to the network.

In another aspect of the disclosure it is to provide an autonomous vehicle comprising:

A non-transitory computer readable storage medium storing instructions for controlling a system of sensor devices strategically placed on an autonomous vehicle to read/receive road information whereby this information is then processed by a hub, then passed onto either an autonomous control system and/or 3D map navigation database system to decide on how to navigate the road safely in a real-time manner, the system comprises of:

The hub includes processing and storage capability;

Sensor devices consisting of components that will transmit a discovery signal, where the discovery signal will be transmitted from the vehicle to the active devices [d1] then the active devices either display or transmit it's information back to the vehicle or display it's information;

Wherein the hub, once the roadway information is processed it is then communicated back to the autonomous control system and/or 3D map navigation database system where a roadway path is formulated for navigation; and Wherein road information is captured and mapped in real-time for use and updated to the network.

In another aspect of the disclosure it is to provide an autonomous vehicle comprising:

A method for sensor devices strategically placed on an autonomous vehicle to read road information whereby this information is then processed by a hub and then passed onto either an autonomous control system and/ or 3D map navigation database system to decide on how to navigate the road safely in a real-time manner, the method comprises of: Providing the hub with processing and storage capability;

Including sensor devices consisting of components that will transmit a discovery signal, where the discovery signal will be transmitted from the vehicle where devices on the roadway can be discovered through reply to the discovery signal or/and acquired by means of reading the display of the devices;

Processing roadway information in the hub which is then communicated back to the autonomous control system and/or 3D map navigation database system, where a roadway path is formulated for navigation; and Capturing and mapping road information in real-time for use and updated to the network.

Additional objects, features and advantages of the present invention will become more readily apparent from the following embodiments when taken in conjunction with the drawings wherein the reference numerals refer to the corresponding parts in the several views.

DESCRIPTION OF DRAWINGS

The description herein makes reference to the accompanying drawings below wherein like reference numerals refer to like parts throughout the several views, and wherein:

FIG. 1—A scenario for autonomous vehicle on a road way—is a diagram representing the various devices [d1] that an autonomous vehicle may encounter in a scenario. Each of the red box representing devices[d1] such as the one directional sign, or the no entry sign, traffic signal lights, person walking on the street, to the person riding a bicycle on the roadways and other cars can be view as devices. Where the autonomous vehicle is represented by the red dot on roof of the vehicle are sensor(s). The sensor(s) may be strategically place on the vehicle and may not be necessary on the roof top.

FIG. 2—Showing discovery signal are sent out by the autonomous vehicle, illustrates how the sensors will pick up the signal from the devices around the autonomous vehicle with discovery signal being sent out. Either by active reply or reflected signal from the devices.

FIG. 3—Various road signs/cone and etc, All the passive device(s) signs, cones and other devices are deployed today and in the future can be converted and/or co-exist with the into the embodiment of the invention. These are some of the sample of the roads signs/cones/bus stop that can be converted from passive to active devices that will allow the autonomous vehicle to be aware of while it is travelling the road way network to a destination.

FIG. 4—Sample of stop signs being converted from passive to active devices it illustrates a stop sign that can be converted from passive device to active devices with powered active electronics powered by solar arrays and/or batteries. There could be a combination power sources that power this device. In this figure, we have 1. Solar array—collects power from sun light; either is fed directly to the active electronic or via battery. 2. Various sizes or shape of the current passive or/and active information display. 3. Various degrees of movement the solar array can be set to best collect sun energy. 4. Pivot point holding the solar array and/or various sensors and/or antenna. Can be place anywhere that is best to collect maximum power or best reception or transmission. 5. This represents the active electronic housing. 6. A post that is placed on the ground to hold the devices. This is only a representation of device as a sign(s). The device can also be a parking space indicator/information system for the autonomous vehicle where the parking spaces are free or occupied within the road way. Where there are sensor that will detect if there is a vehicle occupying the space or not. Or traffic lights, pedestrian, traffic light(s). The holy grail of this invention is a road side information (device) active or passive being alerted by the autonomous vehicle (sensor) in real time and in any weather or luminous conditions.

Devices (could have all the below components or part of it and other future components that are not identified below. It depends on the application):

Electronics
Active network connection
  Wired
  wireless
Power source
  Batteries
  Solar panel
  On site electrical power from utilities grid
  Temporary power from autonomous vehicles
Camera or RF technology
Receiver(s)
Transmitter(s)
Antenna(s)
Sensors for various application (ie. Inferred, audio and etc.)
Push button
GPS capabilities
Sound Generating device(s)
All Weather and All Tempering proofing
May have active electronic/static display to pedestrians or visual aid for autonomous vehicles

DETAILED DESCRIPTION

The embedded devices [d1] are either powered up by itself by itself solar or small long lasting batteries or a combination of all of above and/or can be powered by the car by sending energy sources such as microwaves and etc. The sign information is transmitted back to the approaching vehicles by a common frequency that all autonomous vehicles understand and can interpret and process. Both the sign and the autonomous vehicle sensors and devices can potentially work on a dedicated short-range communication (DSRC) but not limited to DSRC. DSRC works in 5.9 GHz band with bandwidth of 75 MHz and approximate range of 1000 m. Vehicular sensors[s2] and road network devices [D1]

FIG. 1 demonstrates a scenario where the RF transmits energy from red dot on the vehicle rooftop to the surrounding area to discover the create a map of the road way and objects around itself. Where the active devices are actively listening to this signal they will either reply or display the information for the vehicle. The sensor can either be a complete unit system with an integrated sectorized antenna (a ruggedized design suitable for withstanding severe weather condition while strategically placed on the inside or outside of the vehicle), or it can simply be the sensor installed inside the vehicle (1) while a ruggedized, sectorized antenna (connected to the sensor via a RF cable) is strategically mounted on the vehicle exterior.

Based on the information read or received, a detail of the environment could be gathered. In order to have sufficient data points to formulate detail of the devices or objects of the roadway, the transmitted signal needs multitudes of samples per second.

Note in order to cover the front, back, and sides of the vehicle, multiple sensors (and their associated antennas) maybe required to be installed. The number of sensors required is dictated by the achievable data point resolution to accurately generate a 3-D map of the road. As such, the sensor antenna coverage beamwidth and gain (to resolve and coherently receive the reflected signal) performance will contribute to the number of sensors required.

FIG. 2 illustrates how the sensors has to continually send out discovery signals as it traverses the road, so that it has total awareness of the device (objects) of the road it is travelling on in order to make a sound and safe decision in real time. The constant changes in the road information will need to be fed to the vehicle or actively seek for it.

FIG. 3 is the embodiment of the invention. This is a representation of a static sign being converted or co-existing with the active electronic that provide the information to travelling autonomous vehicle(s). This also can be adapted to inform the autonomous autobus that there are passenger waiting at the bus stop.

Once the information is processed and the information is parsed and identified then it is sent to the Autonomous Control System (ACS) and/or the 3D map navigation database system. Below briefly explains the function of each entity and how each interacts with one another.

The sensor sends out the discovery signal from the autonomous vehicle to discover the all the devices on the road as it travel.

All the received data from the sensors are processed by the hub. The main goal of the system is to identify all the device(s) on the road that are within certain distance from itself. After the device(s) are identified and processed, this information is passed to the Autonomous Control System and/or the 3D map navigation system. This has to happen in real time and in advance of the path the vehicle is traveling on.

The 3D map navigation database system, where the road networks are detailed and created into three dimensional images so that the autonomous vehicle can use to traverse to its destination or simply find a suitable parking space. In the scenario where the autonomous vehicle relies on using the 3D detailed mapping database system to obtain the devices on the road as it is traveling, then the proposed system will compare the device(s) information on the 3D map to see if it is up to date with the newly acquired information. In the event there are discrepancies and devices are permanently in nature, the system thus flags the changes for the 3D mapping system to make the updated changes. In the event the device(s) are temporary like traffic cones, then the system utilized this real-time information to navigate.

In a scenario where the autonomous vehicle is acquiring the road information in real time, the identified device(s) information is passed directly to the Autonomous Control System (ACS) for use in navigating the roadway. Once the autonomous vehicle has successfully navigated the roadway, then this information is passed to the 3D mapping system to compare and update the information for future use via locally stored or, via other 3D mapping systems on the network.

FIG. 4 sample of stop signs being converted from passive to active devices it illustrates a stop sign that can be converted from passive device to active devices with powered active electronics powered by solar array and/or battery. There could be a combination of solar and constant reliable power, powering this active device. In this figure, we have 1. Solar array—collect power from sun light, either is fed directly to the active electronic or via battery. 2. Various sizes or shapes of the current passive or/and active information display. 3. Various degrees of movement that the solar array can be set to best collect sun energy. 4. Pivot point holding the solar array and/or various sensors and/or antenna. 5. This represents the active electronic housing. 6. A post that is placed on the ground to hold the devices. This is only a representation of device as a sign(s). The device can also be a parking space indicator/information system for the autonomous vehicle where the parking spaces are free or occupied within the road way, where there are sensor that will detect if there is a vehicle occupying the space or not. Or traffic lights, pedestrian, traffic light(s). The holy grail of this invention is a road side information (device) that is active or passive alerting the autonomous vehicle (sensor) in real time and in any weather or luminous conditions.

As all the device(s) are learnt from all sides of the vehicle, this information can be stored in a 3D map navigation database, or the autonomous control system depending on which database is being used. Further, with the mapping the vehicle can update the mapping process for other vehicles in real time if there have been changes to the road due to construction or other such adjustments.

Based on the above, in the referred embodiment depicted, the system will work even under severe adverse weather conditions. The active sensor devices in the autonomous vehicle continue to read the device(s) on the roadway information at certain frequency intervals in real-time. The sensor in the autonomous vehicle can function independently as a stand-alone system or in conjunction with other existing navigation system (such as the GPS or Lidar systems for example) to give it finer details of the roadway that it is travelling on. The proposed system is superior to other existing systems because, unlike other existing systems, this system will continue to work autonomously even under severe weather conditions such as heavy snowstorm, ice, fog or any other inclement weather.

It is important for the autonomous vehicle to have the latest road network details to navigate. These sensors can be strategically placed in, or mounted on, the vehicle to enable them to read the most accurate road information for either a straight or bent road.

Note that the proposed system does not require modification to the existing road networks, with the exception of changing or installing co-exiting active electronics. Thus, to summarize, the following is a sequence of steps that must happen for the autonomous vehicle to navigate the roadway in the most effective manner:

1. The sensor would send a discovery signal ahead using sonar like technology for example.
2. The road side device(s) either send a reply or display information back to the source.
3. The sensor in the vehicle receives the discovered information signal and passes it on to the processing hub.
4. The hub interprets/processes the information as it receives it in real time.
5. The processed information is translated to a format that is consumable by the autonomous control system or 3D map navigation database system.
6. The autonomous control system or 3D map navigation database system processes the information and makes decision based on the received discovered signals from the proposed device(s).

In order to have the most effective and accurate road information, the sensors would read the information from ahead and from both sides of the vehicle to determine the road way structures and objects. Each side of the road may provide different information as the vehicle travels ahead. Once the information is obtained by the autonomous control system and/or 3D map navigation database system, it then processes it and formulates a decision on how to best navigate. The proposed system will work under any weather condition.

Although described with reference to referred embodiments of the invention, it should be readily understood that various changes and/or modifications can be made to the invention without departing from the spirit thereof. In general, the invention is only intended to be limited by the scope of the following claims.

Thus, the following outlines a set of claims that will help or evolve the self-driving, autonomous vehicles to navigate the road in a more effective manner under normal or sever weather and luminous condition:

The invention claimed is:

1. A system comprising:
an autonomous vehicle comprising a first processor, a first memory storing first executable instructions for execution by the first processor, a control system, a navigation system and a first transceiver operating according to a predetermined wireless protocol;
a plurality of devices deployed with respect to a section of roadway; wherein
a first subset of the plurality of devices are active devices, each active device of the plurality of devices associated with a predetermined element of the roadway comprising a second processor, a second memory storing second executable instructions for execution by the second processor and second transceiver operating according to the predetermined wireless protocol;
a second subset of the plurality of devices are passive devices, each passive device of the plurality of devices associated with a predetermined element of the roadway;
the first executable instructions when executed by the first processor configure the processor to execute a first process comprising:
transmit a discovery signal from the first transceiver;
receive data via the first transceiver from a device of the plurality of devices, the data generated by a device of the plurality of devices in response to the discovery signal and transmitted as a response signal;
process the received data to determine whether first information with respect to the roadway has been received and second information with respect to the roadway has been received;
determining whether first information was received within the processed received data and upon a positive determination passing the first information to the control system for controlling an aspect of the autonomous vehicle; and
determining whether second information was received within the processed received data and upon a positive determination passing the second information to the navigation system;
the second executable instructions when executed by the second processor configure an active device to execute a second process comprising:
receive the discovery signal from the first receiver;
compile data for transmission in dependence upon the element of the roadway with which the active device is associated; and
transmit the compiled data with the second transceiver as the response signal.

2. The system according to claim 1, wherein the predetermined element of the roadway with which an active device of the plurality of devices is associated is selected from the group comprising a traffic sign, a parking sign, a traffic cone, a bus stop.

3. The system according to claim 1, wherein the predetermined element of the roadway with which an active device of the plurality of devices is associated is an element of the physical structure of the roadway itself.

4. The system according to claim 1, wherein the predetermined element of the roadway with which an active device of the plurality of devices is associated is another vehicle and a pedestrian.

5. The system according to claim 1, wherein the predetermined element of the roadway with which a passive device of the plurality of devices is associated is selected from the group comprising a traffic sign, a parking sign, a traffic cone, a bus stop.

6. The system according to claim 1, wherein the predetermined element of the roadway with which a passive device of the plurality of devices is associated is an element of the physical structure of the roadway itself or a lane marker of the roadway.

7. The system according to claim 1, wherein the predetermined element of the roadway with which a passive device of the plurality of devices is associated is a lane marker for the roadway.

8. The system according to claim 1, wherein the predetermined element of the roadway with which an active device of the plurality of devices is associated is another vehicle and a pedestrian.

9. The system according to claim 1, wherein the discovery signal and response signal provide for two way communications independent of weather conditions, ambient environment and ambient illumination.

10. The system according to claim 1, wherein
the first process further comprises:
determining whether the autonomous vehicle has successfully navigated the section of roadway; and
upon a positive determination passing the first information received within the processed received data to the navigation system; and
the navigation system performs a process of:
determining whether the first information was received from a device associated with a predetermined element of the roadway which is fixed infrastructure or a temporary infrastructure;
upon a determination that the first information was received from a device associated with a predetermined element of the roadway which is fixed infrastructure performing a process of:
utilizing the first information to navigate the autonomous vehicle upon the section of roadway;
comparing the first information with third information stored with a third memory accessible to the navigation system relating to the section of roadway;
determining in dependence upon the comparison whether to update the third information within the third memory; and
upon a positive determination updating the third information within the third memory; and
upon a determination that the first information was received from a device associated with a predetermined element of the roadway which is temporary infrastructure utilizing the first information to navigate the autonomous vehicle upon the section of roadway.

11. The system according to claim 1, wherein the first process further comprises repeating the process of transmitting, receiving, processing, and determining at a predetermined frequency in real-time.

12. The system according to claim 1, wherein the autonomous vehicle can navigate the section of roadway independent of any other navigation system.

13. The system according to claim 1, wherein
the first transceiver is associated with a predetermined side of the autonomous vehicle;
the compiled data generated by the second processor is established in dependence upon the direction of travel of the autonomous vehicle.

14. The system according to claim 1, wherein
the compiled data generated by the second processor is established in dependence upon the direction of travel of the autonomous vehicle.

15. A system comprising:
an autonomous vehicle comprising a first processor, a first memory storing first executable instructions for execution by the first processor, a control system, a navigation system and a first transceiver operating according to a predetermined wireless protocol;
a plurality of devices deployed with respect to a section of roadway;
the first executable instructions when executed by the first processor configure the processor to execute a first process comprising:
  transmit a discovery signal from the first transceiver;
  receive data via the first transceiver from a device of the plurality of devices, the data generated by a device of the plurality of devices in response to the discovery signal and transmitted as a response signal;
  process the received data to determine whether first information with respect to the roadway has been received and second information with respect to the roadway has been received;
  determining whether first information was received within the processed received data and upon a positive determination passing the first information to the control system for controlling an aspect of the autonomous vehicle; and
  determining whether second information was received within the processed received data and upon a positive determination passing the second information to the navigation system.

16. The system according to claim 15, wherein
a first subset of the plurality of devices are active devices, each active device of the plurality of devices associated with a predetermined element of the roadway comprising a second processor, a second memory storing second executable instructions for execution by the second processor and second transceiver operating according to the predetermined wireless protocol;
a second subset of the plurality of devices are passive devices, each passive device of the plurality of devices associated with a predetermined element of the roadway; and
the second executable instructions when executed by the second processor configure an active device to execute a second process comprising:
  receive the discovery signal from the first receiver;
  compile data for transmission in dependence upon the element of the roadway with which the active device is associated; and
  transmit the compiled data with the second transceiver as the response signal.

17. The system according to claim 16, wherein
when the predetermined element of the roadway with which an active device of the plurality of devices is associated is selected from the group comprising a traffic sign, a parking sign, a traffic cone, a bus stop, an element of the physical structure of the roadway itself, another vehicle and a pedestrian; and
when the predetermined element of the roadway with which a passive device of the plurality of devices is associated is selected from the group comprising a traffic cone, an element of the physical structure of the roadway itself and a lane marker of the roadway.

18. The system according to claim 16, wherein
the compiled data generated by the second processor is established in dependence upon the direction of travel of the autonomous vehicle.

19. The system according to claim 15, wherein
the first process further comprises:
  determining whether the autonomous vehicle has successfully navigated the section of roadway; and
  upon a positive determination passing the first information received within the processed received data to the navigation system; and
the navigation system performs a process of:
  determining whether the first information was received from a device associated with a predetermined element of the roadway which is fixed infrastructure or a temporary infrastructure;
  upon a determination that the first information was received from a device associated with a predetermined element of the roadway which is fixed infrastructure performing a process of:
    utilizing the first information to navigate the autonomous vehicle upon the section of roadway;
    comparing the first information with third information stored with a third memory accessible to the navigation system relating to the section of roadway;
    determining in dependence upon the comparison whether to update the third information within the third memory; and
    upon a positive determination updating the third information within the third memory; and
  upon a determination that the first information was received from a device associated with a predetermined element of the roadway which is temporary infrastructure utilizing the first information to navigate the autonomous vehicle upon the section of roadway.

20. The system according to claim 15
a first subset of the plurality of devices are active devices, each active device of the plurality of devices associated with a predetermined element of the roadway and comprising electronics to transmit data to the autonomous signal in dependence upon receipt of the discovery signal;
a second subset of the plurality of devices are passive devices, each passive device of the plurality of devices associated with a predetermined element of the roadway; and
the received data received from an active device is generated in dependence upon a direction of travel of the autonomous vehicle relative to the predetermined element of the roadway the active device is associated with.

\* \* \* \* \*